US006745994B2

(12) United States Patent
Klug et al.

(10) Patent No.: US 6,745,994 B2
(45) Date of Patent: Jun. 8, 2004

(54) DEVICE FOR REPOSITIONING A ROTATING ELEMENT

(75) Inventors: Harald Klug, Nuremberg (DE); Alexander Braun, Pforzheim (DE); Friedrich Wendel, Weissach (DE); Claudio Pupo, Schwabach (DE); Reiner Schweinfurth, Eppingen (DE); Klaus Kaiser, Markgroeningen (DE); Johannes Meiwes, Markgroeningen (DE); Michael Brozio, Korntal-Muenchingen (DE); Uwe Hammer, Hemmingen (DE); Stefan Josten, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/239,508

(22) PCT Filed: Jan. 23, 2002

(86) PCT No.: PCT/DE02/00214

§ 371 (c)(1),
(2), (4) Date: Feb. 12, 2003

(87) PCT Pub. No.: WO02/059470

PCT Pub. Date: Aug. 1, 2002

(65) Prior Publication Data

US 2003/0145827 A1 Aug. 7, 2003

(51) Int. Cl.[7] ............................ F02D 9/02; F16H 61/02

(52) U.S. Cl. .................................. 251/69; 74/2; 137/65

(58) Field of Search ..................... 251/66–74, 336–338; 137/47–58, 65–66; 74/2–4

(56) References Cited

U.S. PATENT DOCUMENTS

| | | | | |
|---|---|---|---|---|
| 4,625,943 A | * 12/1986 | Groger | ....................... | 251/305 |
| 5,996,551 A | * 12/1999 | Schroder | .................... | 123/337 |
| 6,364,287 B1 | * 4/2002 | Rauch et al. | ............... | 251/305 |
| 6,568,652 B2 | * 5/2003 | Kaiser et al. | ................. | 251/69 |

FOREIGN PATENT DOCUMENTS

| | | |
|---|---|---|
| DE | 39 18 852 A | 12/1990 |
| DE | 0 523 432 A | 1/1993 |
| DE | 100 13 917 A | 9/2001 |

* cited by examiner

*Primary Examiner*—Paul J. Hirsch
(74) *Attorney, Agent, or Firm*—Ronald E. Greigg

(57) ABSTRACT

A device for restoring a rotary member into a defined normal position, with a spatially stationary fixed catch, which predetermines the normal position, and a driver catch, which is coupled to the rotary member and can be moved past the fixed catch, each of which has stop surfaces embodied on each of its opposing sides, and with a clamping spring, which encompasses the catches in a prestressed fashion with two bent spring legs, in order to prevent a rotary play between the clamping spring and the catches in the normal position, and an elastic spring element in at least one leg section of the spring legs extending across the stop surfaces of the catches, which spring element is supported against the associated stop surface with a spring force that is less powerful than the prestressing force of the clamping spring.

21 Claims, 2 Drawing Sheets

DEVICE FOR REPOSITIONING A ROTATING ELEMENT

CROSS-REFERENCE TO RELATED APPLICATIONS

This application is a 35 USC 371 application of PCT/DE 02/00214 filed on Jan. 23, 2002.

BACKGROUND OF THE INVENTION

1. Field of the Invention

The invention is based on a device for restoring a rotary member into a defined normal position, in particular for restoring a throttle valve shaft, which supports a throttle valve for controlling the combustion air of an internal combustion engine, into an emergency air position of the throttle valve.

2. Description of the Prior Art

When used in a throttle valve, a restoring device of this kind, in the event of a failure of the throttle valve drive unit—e.g. an electric motor—is used for restoring the throttle valve into a defined normal position, the so-called emergency air position or limp-home position, in which a minimal throttle valve opening is assured for the supply of combustion air to the internal combustion engine so that the engine continues to run smoothly at an idle or at a minimal load. Due to tolerances in the catches and due to the bending imprecision of the bent spring legs of the clamping spring, in the normal position in which the fixed catch and the driver catch are offset from each other radially and are disposed approximately congruently next to one another, there is a certain amount of play, which leads to a rotary play of the throttle valve and renders a precise control in this region impossible.

In a known restoring device for restoring a throttle valve contained in a throttle valve assembly in an internal combustion engine (DE 197 35 046 A1), oblique stop surfaces are provided on the fixed catch and driver catch in order to prevent rotary play between the catches in the normal position. The spring leg of the clamping spring, which leg is bent at the one spring end, is held against the oblique stop surfaces on the one side of the fixed catch and driver catch while the spring leg, which is bent at the other spring end of the clamping spring, is held against the flat stop surfaces extending parallel to the rotation axis on the other side of the fixed catch and driver catch. By means of the oblique stop surfaces, the spring leg is supported with half the respective spring force against the two oblique stop surfaces and as a result, moves the rotatable driver catch toward the stop constituted by the spring leg on the other side of the fixed catch and driver catch.

DE 100 13 917.5 has already proposed disposing a compensation spring, which has a definite spring force oriented counter to the prestressing force of the clamping spring, between a spring leg of the clamping spring and a stop surface on one of the catches in order to prevent a rotary play of the driver catch in the emergency air position. The compensation spring, which is manufactured as a stamped part, is affixed to one of the catches, with a spring leaf disposed in front of the one stop surface of the catch, which spring leaf rests with its free leaf end in a prestressed fashion against a spring stop, which limits the spring path of the spring leaf and is disposed spaced apart from the stop surface.

SUMMARY OF THE INVENTION

The restoring device according to the invention has the advantage that the play between the catches and the spring legs of the clamping spring in the normal position of the rotary member is prevented without additional parts, which would in turn necessitate manufacturing and installation expenditures, and therefore the characteristic curve of the clamping spring is not changed. The elastic spring element provided for this purpose on at least one of the two spring legs presses against the associated stop surface with a spring force that is less powerful than the prestressing force of the clamping spring in the normal position of the rotary member, so that as a result, in the normal position of the rotary member, the two spring legs rest against all four stop surfaces of the two catches and therefore prevent any play of the rotary member.

According to one advantageous embodiment of the invention, the spring element extends across a stop surface on the fixed catch and across a stop surface on the driver catch, and is constituted by one of the two spring legs of the clamping spring itself, in that the cross section of the spring wire of the clamping spring is reduced in the leg region of this spring leg and/or this spring leg is dimensioned to be of appropriate length. As a result, the at least one spring leg has an elasticity such that despite a width difference between the two catches, it rests against both stop surfaces and consequently does not permit any relative play between the two catches in the normal position of the rotary member.

In an alternative embodiment of the invention, a flexible tongue protruding from the leg section constitutes the spring element. Preferably, the flexible tongue is bent in one piece from the leg end of the spring leg. This has the advantage of a simpler manufacture of the spring element since the clamping spring must be bent at only one leg end before being hardened, which is relatively simple to achieve.

According to an advantageous embodiment of the invention, the catch whose stop surface is acted on by the flexible tongues is embodied with a width in the rotation direction of the driver catch that is always less than the width of the other catch, taking into to account permissible tolerances. As a result, the functionally optimal association of flexible tongue and stop surface is always assured in a reproducible manner.

According to another embodiment of the invention, in addition to the axial spring element, which extends across a respective stop surface of the fixed catch and the driver catch and which is comprised by one of the spring legs through cross sectional reduction or length measurement, an additional elastic spring element is disposed at the leg end of the spring leg, which additional spring element is embodied as a flexible tongue that is bent in one piece from the spring leg and rests in a prestressed fashion against a stop surface. In this embodiment of the restoring device, the two above-mentioned alternative possibilities for embodying an elastic spring element are embodied simultaneously in a leg section of at least one spring leg. This can be advantageous if a relatively large degree of play between the catches and the spring legs in the normal position of the rotary member is to be expected due to manufacturing conditions.

BRIEF DESCRIPTION OF THE DRAWINGS

The invention will be explained in detail herein below in conjunction with exemplary embodiments shown in the drawings, in which.

DESCRIPTION OF THE PREFERRED EMBODIMENTS

Figure 1:
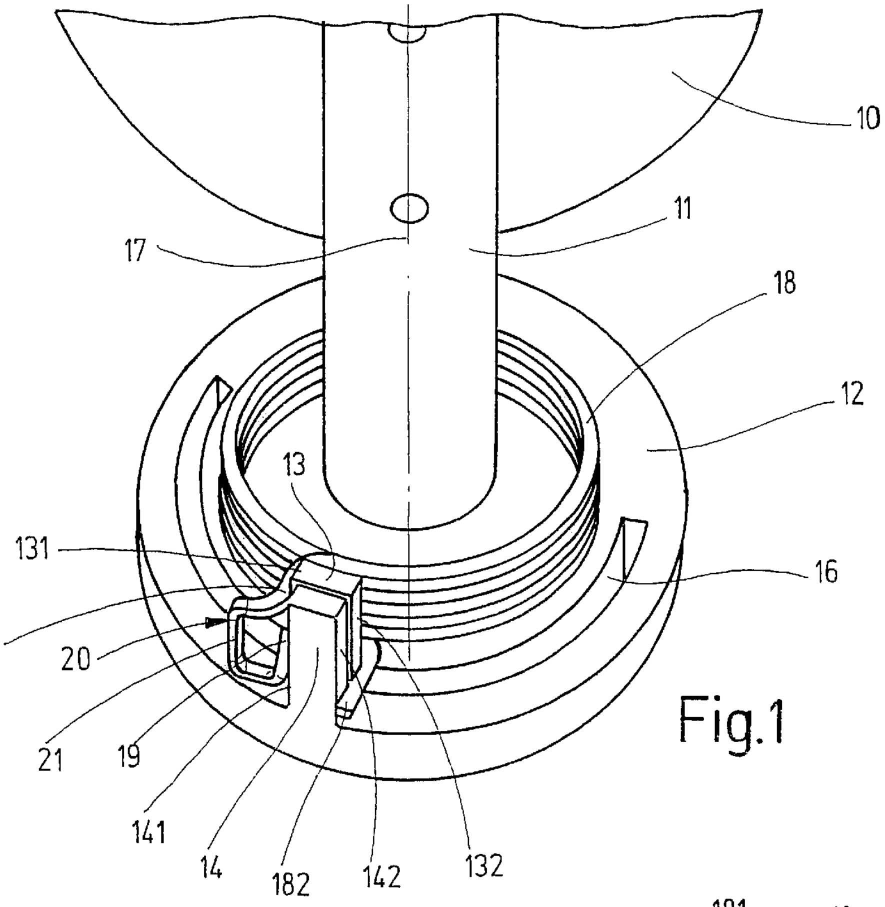
FIG. 1 shows a three-dimensional detail of a restoring device for a throttle valve.

In the three-dimensional detail of a device shown in FIG. 1, which is for restoring a rotary member into a defined normal position, the rotary member is a throttle valve shaft 11, which non-rotatably supports a throttle valve 10. As is known, the throttle valve 10 that controls the combustion air of an internal combustion engine is disposed in an air intake fitting, not shown here, of the internal combustion engine and, by unblocking the intake cross section in the intake fitting to a greater or lesser degree, controls the combustion air quantity aspirated by the internal combustion engine. In order to turn the throttle valve shaft 11 and therefore the throttle valve 10, the former has a driver 12 rigidly fastened to it, which is actuated by a drive unit not shown here. Normally, the driver 12 has a toothed segment, which engages with a gear mechanism supported on the drive shaft of an electric motor. In the normal position of the rotary member, the throttle valve 10 assumes a so-called emergency air or limp-home position in which it throttles the intake cross section of the intake fitting to such an extent that the aspirated combustion air permits only a limp-home operation of the internal combustion engine.

Figure 2:
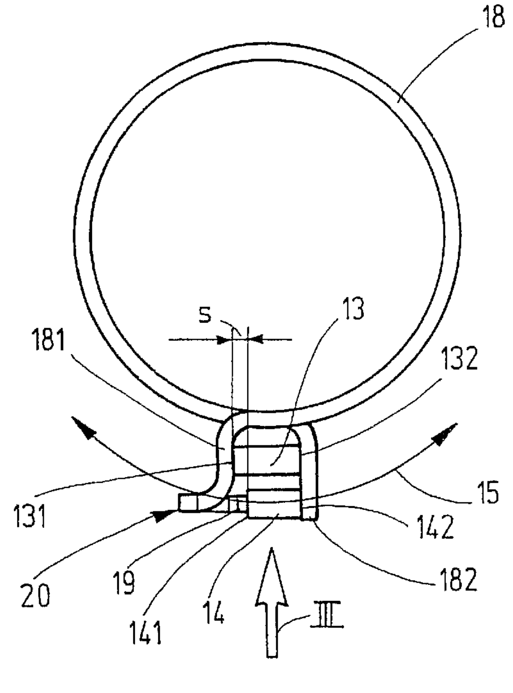
FIG. 2 shows a top view of the clamping spring and catches of the restoring device in FIG. 1 disposed in a normal position.

The restoring device has a spatially stationary fixed catch 13, which predetermines the normal position of the rotary member or the throttle valve shaft 11—and therefore the emergency air position of the throttle valve 10—and can be embodied for example on a housing that contains the throttle valve shaft 11 in a rotating fashion, and a driver catch 14, which is embodied on the driver 12 and is disposed on this driver 12 in such a way that it can be moved past the fixed catch 13 in both rotation directions indicated by the arrow 15 in FIG. 2. As shown in FIG. 1, the fixed catch 13 extends through an arc-shaped opening 16, which is provided in the driver 12, is disposed coaxial to the axis 17 of the throttle valve shaft 11, and extends over a rotation range of the driver 12. The length of the opening 16 defines the rotation range of the driver 12. Both the fixed catch 13 and the driver catch 14 have stop surfaces 131, 132; 141, 142 embodied on each of their opposing sides in terms of the rotation direction.

The restoring device also includes a clamping spring 18, which is embodied here in the form of a helical torsion spring with bent spring legs 181, 182 at the spring ends. The clamping spring 18 is disposed coaxial to the driver 12 and its spring legs 181, 182 extend lateral to the axis 17 of the driver 12 and the throttle valve shaft 11. The spring legs 181, 182 of the clamping spring 18 embrace the fixed catch 13 and the driver catch 14 in a prestressed fashion and fix the normal position of the restoring device, from which the throttle valve shaft 11 with the throttle valve 10 can be rotated by turning the driver 12 in one or the other rotation direction, which places tension on the clamping spring 18. In the normal position of the restoring device shown in FIG. 1, each spring leg 181, 182 engages a stop surface 131, 132 on the fixed catch 13 and a stop surface 141, 142 on the driver catch 14. In a rotation starting from the normal position, depending on the rotation direction of the driver 12, the spring leg 181 or 182 is carried along by the stop surface 141 or 142 of the driver catch 14, while the other spring leg 182 or 181 is supported against the stop surface 132 or 131 of the fixed catch 13.

Due to manufacturing tolerances, in the normal position of the rotary member or throttle valve shaft 11, there can be a rotary play s between the clamping spring 18 and the catches 13, 14, as shown in FIG. 2, if the spring legs 181 and 182 do not rest against all four stop surfaces 131, 132 and 141, 142 of the catches 13, 14, but only against three of the stop surfaces. In the exemplary embodiment shown in FIG. 2, the leg 182 of the clamping spring 18 rests against the stop surfaces 132 and 142 of the fixed catch 13 and driver catch 14 and the spring leg 181 of the clamping spring 18 rests only against the stop surface 131 of the fixed catch 13 due to the insufficient width of the driver catch 14. In the normal position, the clamping spring 18—and therefore the driver catch 14 and rotary member—can rotate in relation to the fixed catch 13 by the amount of play s.

Figure 3:
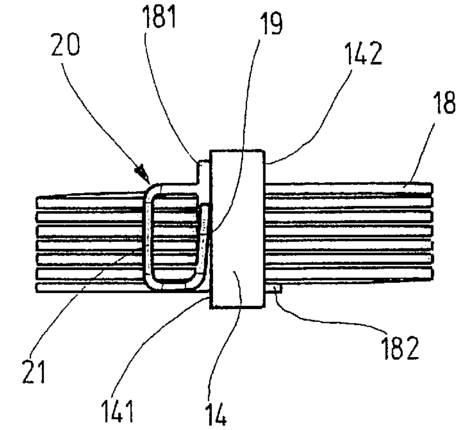
FIG. 3 shows a view in the direction of the arrow III in FIG. 2.

In order to eliminate this play in the normal position of the rotary member or throttle valve shaft 11, which play interferes with the combustion air control in the emergency air position of the throttle valve, an elastic spring element is provided in the leg section of the spring leg 181 and this elastic spring element extends across the stop surface 141 of the driver catch 14 and is supported against the stop surface 141 of the driver catch 14 with a spring force that is less powerful than the prestressing force of the clamping spring in the normal position of the rotary member or throttle valve shaft 11. In the exemplary embodiment shown in FIGS. 1 to 3, the elastic spring element is constituted by a flexible tongue 19, which is bent of one piece from the leg end of the spring leg 181. As shown particularly clearly in FIGS. 1 and 3, the flexible tongue 19 is constituted by the free clip leg of a U-shaped spring clip 20, which is bent from the leg end and is aligned in the rotation direction of the driver catch 14, and whose other clip leg 21, which is of one piece with the spring leg 181 on the side of the flexible tongue 19 oriented away from the stop surface 141, extends above the axial height of the helical torsion spring.

Naturally, it is also possible to embody the flexible tongue 19 in the leg section of the spring leg 181, which extends across the stop surface 131 of the fixed catch 13. However, this is disadvantageous from a manufacturing standpoint and it is therefore preferable to bend the flexible tongue 19 from leg end of the spring leg 181.

When the flexible tongue 19 is embodied at the leg end, in order to prevent the fixed catch 13 from being narrower than the driver catch 14 as a result of manufacturing tolerances, the driver catch 14 is preferably embodied with a width in the rotation direction of driver catch 14 that is smaller than the width of the fixed catch 13, taking into account the maximal permissible manufacturing tolerances. As a result, the two spring legs 181 and 182 always rest against all four stop surfaces 131, 132, 141, 142; the contact of the spring leg 181 against the stop surface 141 of the driver catch 14 is produced by means of the flexible tongue 19.

Instead of the spring leg 181, naturally also the spring leg 182 can be provided with the above-described flexible tongue 19, which then presses against the stop surface 142 of the driver catch 14.

Figure 4:
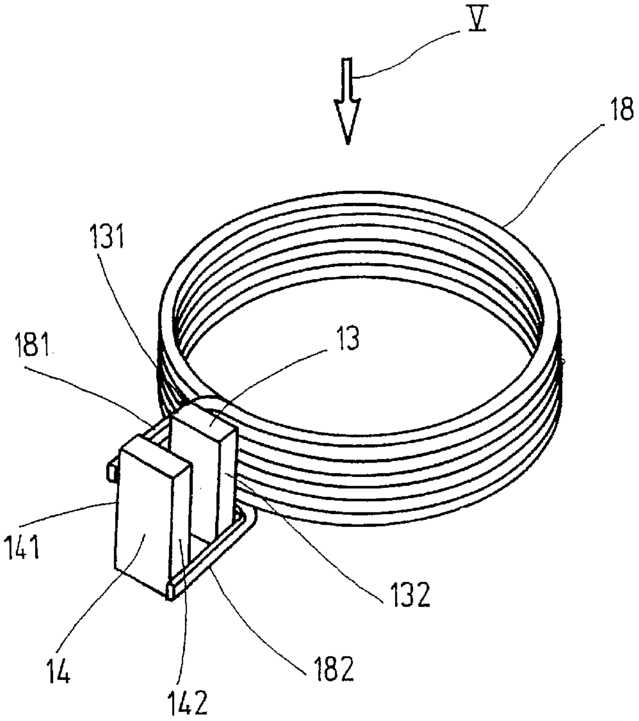
FIG. 4 shows a three-dimensional depiction of the clamping spring and catches of the restoring device in the normal position, according to another exemplary embodiment.
Figure 5:
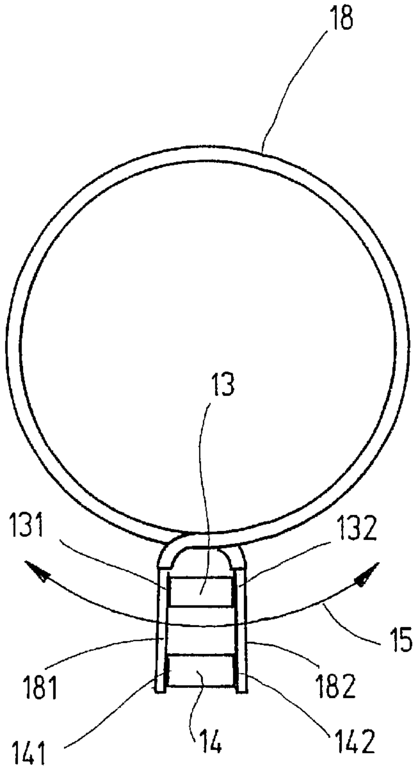
FIG. 5 shows a top view in the direction of the arrow V in FIG. 4.

FIGS. 4 and 5 show another exemplary embodiment of the restoring device in a depiction, which shows only the clamping spring 18, which is once again embodied as a helical torsion spring, as well as the fixed catch 13 and the driver catch 14. In order to eliminate a rotary play between the clamping spring 18 and catches 13, 14 in the normal position of the rotary member or throttle valve shaft 11, as in the exemplary embodiment of FIGS. 1 to 3, an elastic spring element is provided in at least one leg section of the spring legs 181, 182 extending across one of the stop surfaces 131, 141, 132, 142 of the catches 13, 14, and this spring element is supported against the stop surface associated with the leg section with a spring force that is less powerful than the prestressing force of the clamping spring 18 in the normal position of the rotary member. In the specific exemplary embodiment of FIGS. 4 and 5, one spring element extends across the stop surfaces 131 and 141 and one spring element extends across the stop surfaces 132 and 142 of the catches 13, 14; each spring element is constituted by a spring leg 181, 182 itself by virtue of the fact that the cross section of the spring wire of the clamping spring 18 is reduced in the leg region. Such a reduction is achieved, for example, by stamping the legs or by rolling out the spring wire in the leg region; the spring legs 181, 182 can taper toward their leg ends. This embodiment of the spring legs 181, 182 gives them enough elasticity that even when the two catches 13, 14 have different widths in the rotation direction of the driver catch 14, the spring legs rest against all four stop surfaces 131, 141, 132, 142 so that no rotary play of the rotary member is possible in its normal position.

This spring elastic effect of the two spring legs 181, 182 can be achieved not only by reducing the cross section, but also embodying the spring legs 181, 182 with an appropriate length. The stop surfaces 131, 132; 141, 142 of the catches 13, 14 are spaced radially far enough apart from each other that the able to flex over this distance. If a large rotary play between the catches 13, 14 must be compensated, then it is advantageous to embody the spring legs 181, 182 both as relatively long and with a reduced spring wire cross section.

Figure 6:
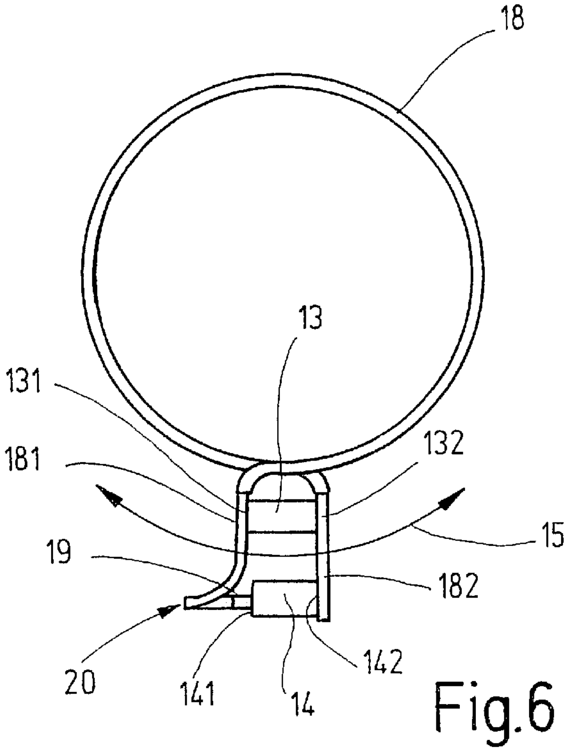
FIG. 6 shows the same depiction as FIG. 5 according to another exemplary embodiment of the restoring device.

In the third exemplary embodiment of the restoring device, of which only the clamping spring 18 and catches 13, 14 are once again shown in FIG. 6, the spring legs 181, 182 are embodied in the same way as in the exemplary embodiment of the restoring device according to FIGS. 4 and 5, i.e. as relatively long and with a reduced wire cross section in relation to the cross section of the spring wire 18. In addition, as in the exemplary embodiment of the restoring device according to FIGS. 1 to 3, the leg end of the spring leg 181 is likewise provided with an additional elastic spring element in the form of a flexible tongue 19' that is bent in one piece from the spring leg 181 and rests in a prestressed fashion against the stop surface 141 of the driver catch 14. In the same way as described in the exemplary embodiment in FIGS. 1 to 3, this flexible tongue 19' is constituted by the free clip leg of a spring clip 20 that is bent from the leg end. In this exemplary embodiment of the restoring device, an elastic spring element is thus provided in the spring leg 182 and is embodied in the same way as in the exemplary embodiment according to FIGS. 4 and 5, and two elastic spring elements are provided in the spring leg 181, one of which is embodied in the same way as the spring element in the exemplary embodiment according to FIGS. 4 and 5 and the other is embodied in the same way as the spring element in the exemplary embodiment of FIGS. 1 to 3.

The invention is not limited to the exemplary embodiments described above. The positions of the fixed catch 13 and driver catch 14 can therefore be switched so that the fixed catch 13 is disposed on the outside and the driver catch 14 is disposed on the inside, close to the clamping spring 18. The uses of the above-described device for restoring a rotary member is not limited to controlling the combustion air of an internal combustion engine by means of a throttle valve. Thus, the rotary member can also be a pivoting shaft of an exhaust valve, which is connected to said shaft and is disposed in an exhaust return line of the internal combustion engine and meters the quantity of exhaust added to the intake air of the engine.

The foregoing relates to preferred exemplary embodiments of the invention, it being understood that other variants and embodiments thereof are possible within the spirit and scope of the invention, the latter being defined by the appended claims.

We claim:

1. A device for restoring a rotary member into a defined normal position, comprising a spatially stationary fixed catch (13), which predetermines the normal position, a driver catch (14), which is coupled to the rotary member and can be moved past the fixed catch (13), said catches (13, 14) each having stop surfaces (131, 132, 141, 142) embodied on each of its opposing sides, a clamping spring (18) which encompasses the catches (13, 14) in a prestressed fashion with two bent spring legs (181, 182) that extend across the stop surfaces (131, 132, 141, 142) of the catches (13, 14), and at least one leg section of the spring legs (181, 182) extending across one of the stop surfaces (131, 141, 132, 142) of the catches (13, 14), including an elastic spring element, the elastic spring element being supported against the stop surface associated with the leg section with a spring force that is less powerful than the prestressing force of the clamping spring (18) in the normal position of the rotary member.

2.The device according to claim 1, wherein the spring element extends across a respective stop surface (131, 141 and 132, 142) of the fixed catch (13) and the driver catch (14), and is constituted by one of the spring legs (181, 182) itself.

3. The device according to claim 2, wherein the cross section of the spring wire of the clamping spring (18) is reduced in the vicinity of the spring leg (181 or 182) in order to produce a spring elasticity of the spring leg (181 or 182).

4. The device according to claim 3, wherein the cross sectional reduction of the spring wire is produced by stamping or rolling out the at least one spring leg (181, 182).

5. The device according to claim 2, wherein the spring leg is embodied as being of sufficient length to produce a spring elasticity of the spring leg (181 or 182).

6. The device according to claim 2, wherein the stop surfaces (131, 141 and 132, 142) of the catches (13, 14) engaged by the spring leg (181 or 182) are spaced radially far enough apart from each other that the spring leg (181 or 182) is able to flex between its contact regions against the stop surfaces (131, 141 and 132, 142).

7. The device according to claim 3, wherein the stop surfaces (131, 141 and 132, 142) of the catches (13, 14) engaged by the spring leg (181 or 182) are spaced radially far enough apart from each other that the spring leg (181 or 182) is able to flex between its contact regions against the stop surfaces (131, 141 and 132, 142).

8. The device according to claim 4, wherein the stop surfaces (131, 141 and 132, 142) of the catches (13, 14) engaged by the spring leg (181 or 182) are spaced radially far enough apart from each other that the spring leg (181 or 182) is able to flex between its contact regions against the stop surfaces (131, 141 and 132, 142).

9. The device according to claim 5, wherein the stop surfaces (131, 141 and 132, 142) of the catches (13, 14) engaged by the spring leg (181 or 182) are spaced radially far enough apart from each other that the spring leg (181 or 182) is able to flex between its contact regions against the stop surfaces (131, 141 and 132, 142).

10. The device according claim 2, the at least one spring leg (181, 182) tapers toward its leg end.

11. The device according claim 5, the at least one spring leg (181, 182) tapers toward its leg end.

12. The device according to claim 2, further comprising an additional elastic spring element at the leg end of at least one spring leg (181) embodied as a flexible tongue (19') that is bent in one piece from the spring leg (181) and rests in a prestressed fashion against a stop surface (141).

13. The device according to claim 1, wherein the spring element is constituted by a flexible tongue (19) that protrudes from the leg section.

14. The device according to claim 13, wherein the flexible tongue (19) is bent in one piece from the leg end of the spring leg (181).

15. The device according to claim 12, wherein the flexible tongue (19; 19') is constituted by the free clip leg of a U-shaped spring clip (20; 20'), which is bent from the leg end and is aligned in the rotation direction of the driver catch (14).

16. The device according to claim 1, wherein the clamping spring (18) is embodied as a cylindrical helical torsion spring and is disposed coaxial to the rotary member.

17. The device according to claim 15, wherein the clamping spring (18) is embodied as a cylindrical helical torsion spring and is disposed coaxial to the rotary member, and wherein the other clip leg (21) of the U-shaped spring clip (20), which is of one piece with the spring leg, on the side of the free clip leg oriented away from the stop surface (141), extends above the axial height of the helical torsion spring.

18. The device according to claim 1, wherein the rotary member is connected to a valve for controlling an internal combustion engine.

19. The device according to claim 18, wherein the rotary member is connected to an exhaust valve in an exhaust return line of the internal combustion engine.

20. The device according to claim 18, wherein the rotary member is connected to a throttle valve (10) in an air intake fitting of the internal combustion engine.

21. The device according to claim 20, wherein the normal position of the rotary member corresponds to the emergency air position of the internal combustion engine.

* * * * *

UNITED STATES PATENT AND TRADEMARK OFFICE

CERTIFICATE OF CORRECTION

PATENT NO. : 6,745,994 B2
DATED : June 8, 2004
INVENTOR(S) : Harald Klug et al.

It is certified that error appears in the above-identified patent and that said Letters Patent is hereby corrected as shown below:

Title page,
Item [75], Inventors: should read as follows:
-- Harald Klug, Nuernburg (DE);
Item [30], Foreign Application Priority Data
January 23, 2001 (DE) ……….. 1 01 02 776
Item [56], References Cited, U.S. PATENT DOCUMENTS
5,492,097 A 2/1996 BYRAM et al
FOREIGN PATENT DOCUMENTS
EP 0 523 432 A 1/1993 --

Signed and Sealed this

Seventh Day of September, 2004

JON W. DUDAS
*Director of the United States Patent and Trademark Office*